Nov. 18, 1958 — R. W. SONNENFELDT — 2,861,180
DETECTOR FOR VESTIGIAL SIDEBAND SIGNALS
Filed May 2, 1955 — 6 Sheets-Sheet 1
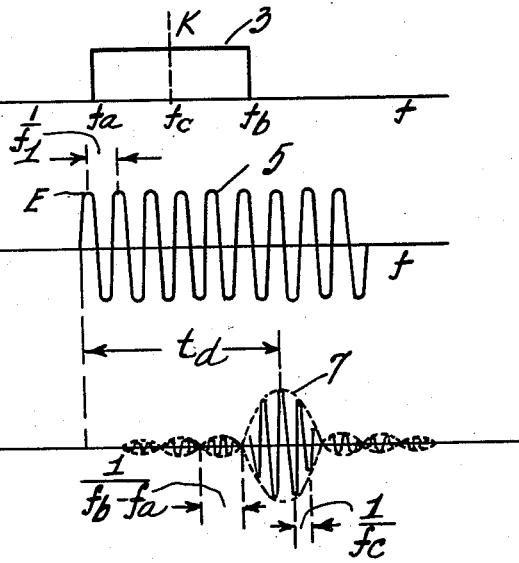
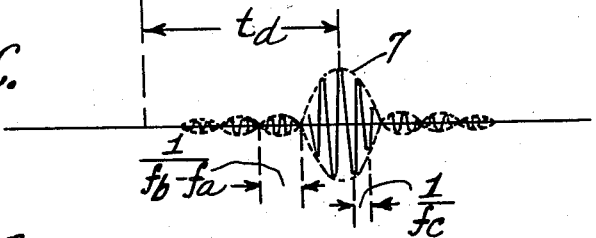
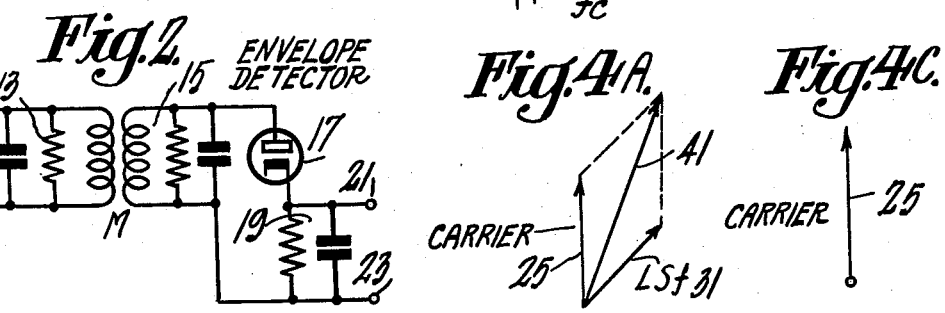
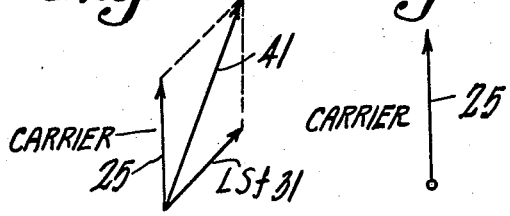
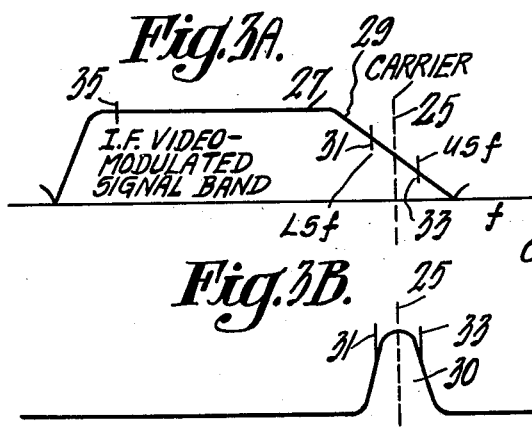
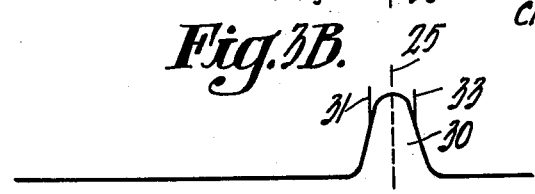
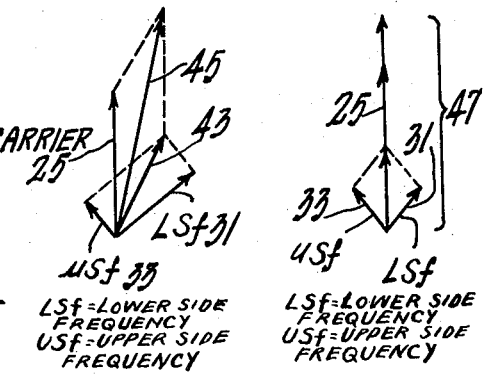
INVENTOR.
RICHARD W. SONNENFELDT
BY
ATTORNEY Nov. 18, 1958     R. W. SONNENFELDT     2,861,180
DETECTOR FOR VESTIGIAL SIDEBAND SIGNALS
Filed May 2, 1955     6 Sheets-Sheet 2
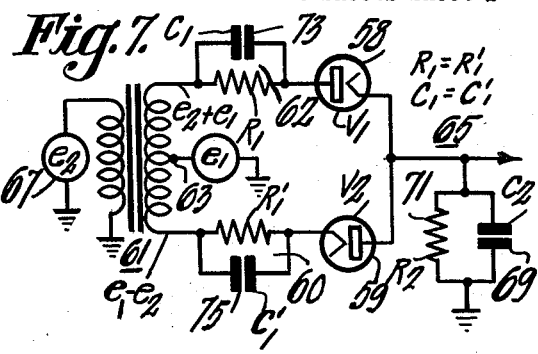
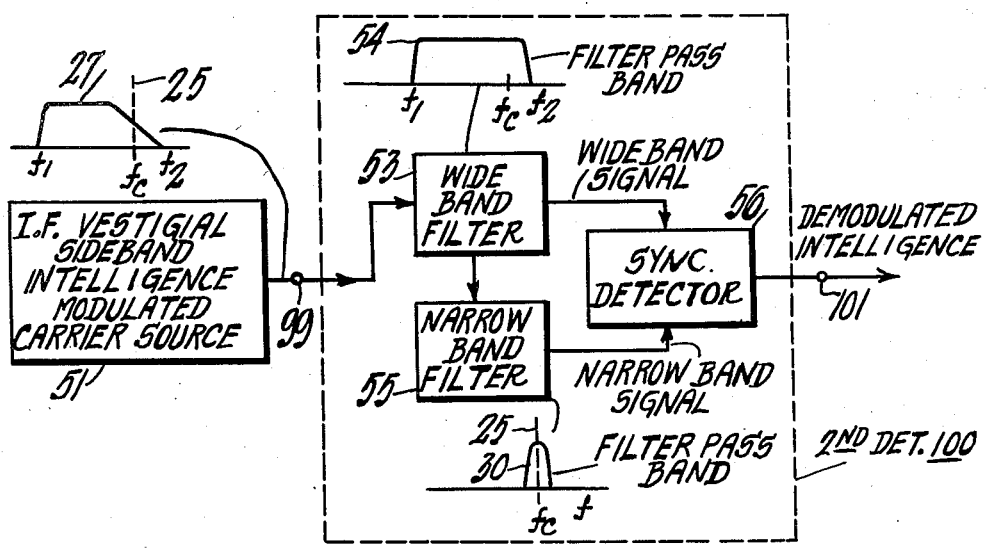
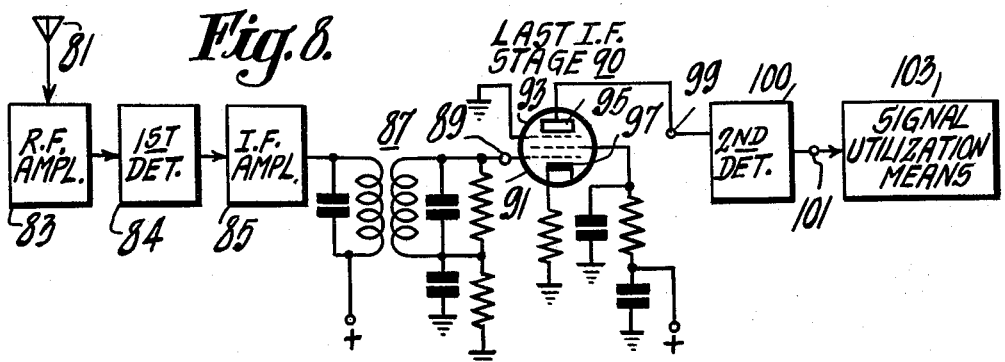
INVENTOR.
RICHARD W. SONNENFELDT
BY
ATTORNEY Nov. 18, 1958 — R. W. SONNENFELDT — 2,861,180
DETECTOR FOR VESTIGIAL SIDEBAND SIGNALS
Filed May 2, 1955 — 6 Sheets-Sheet 3
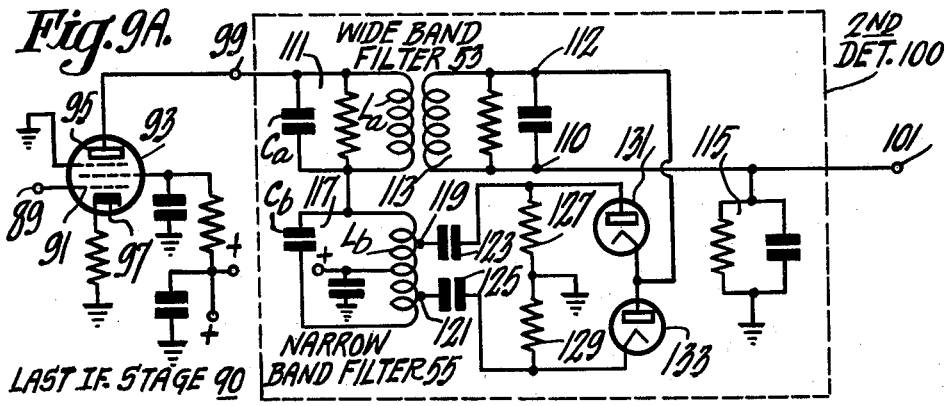
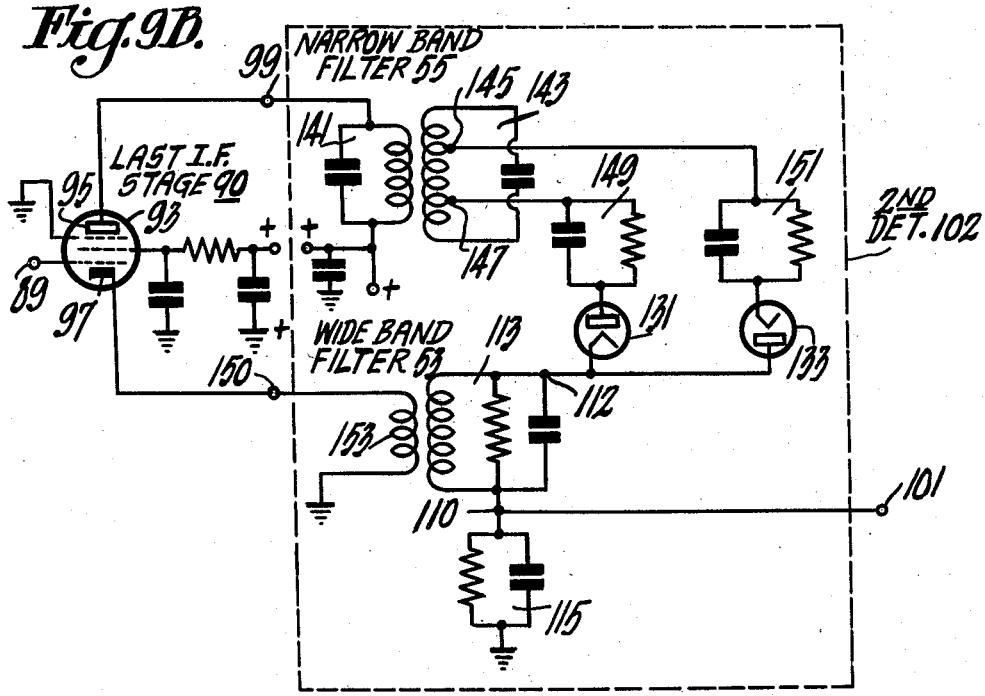
INVENTOR.
RICHARD W. SONNENFELDT
BY
ATTORNEY

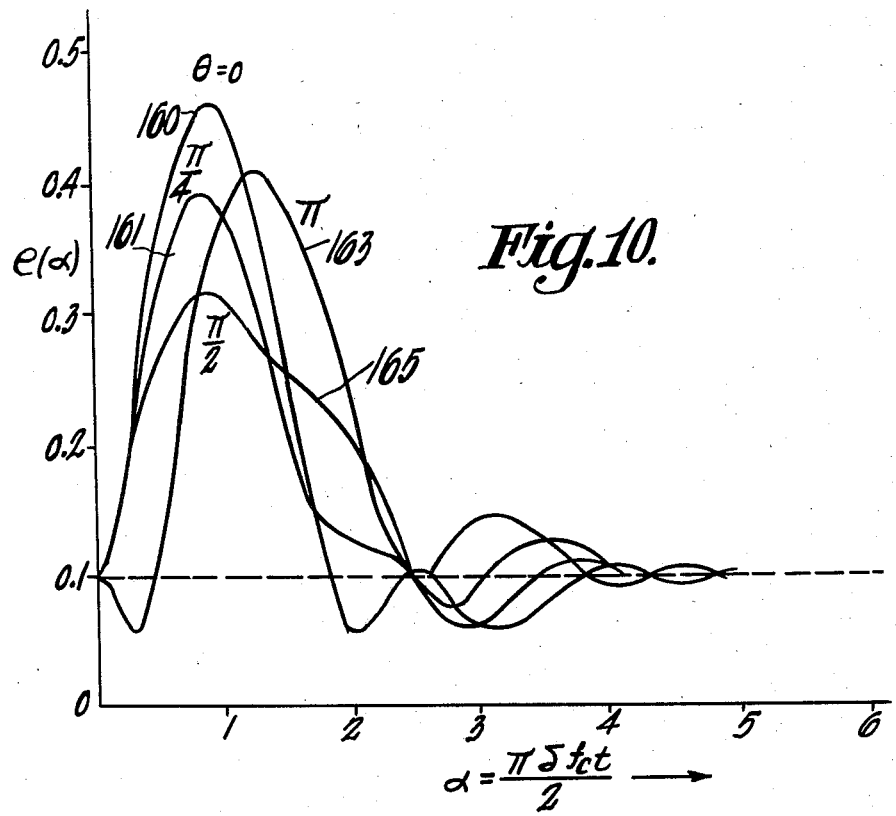
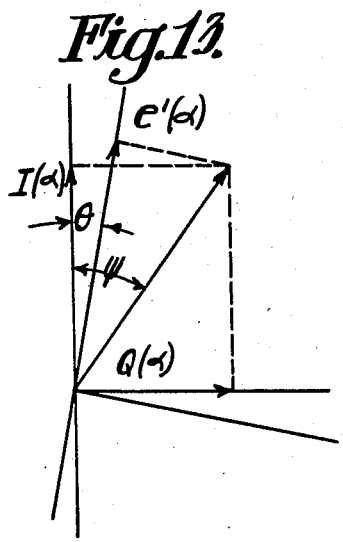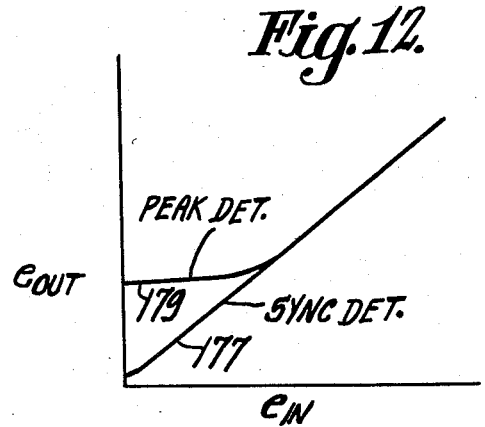
INVENTOR.
RICHARD W. SONNENFELDT
ATTORNEY

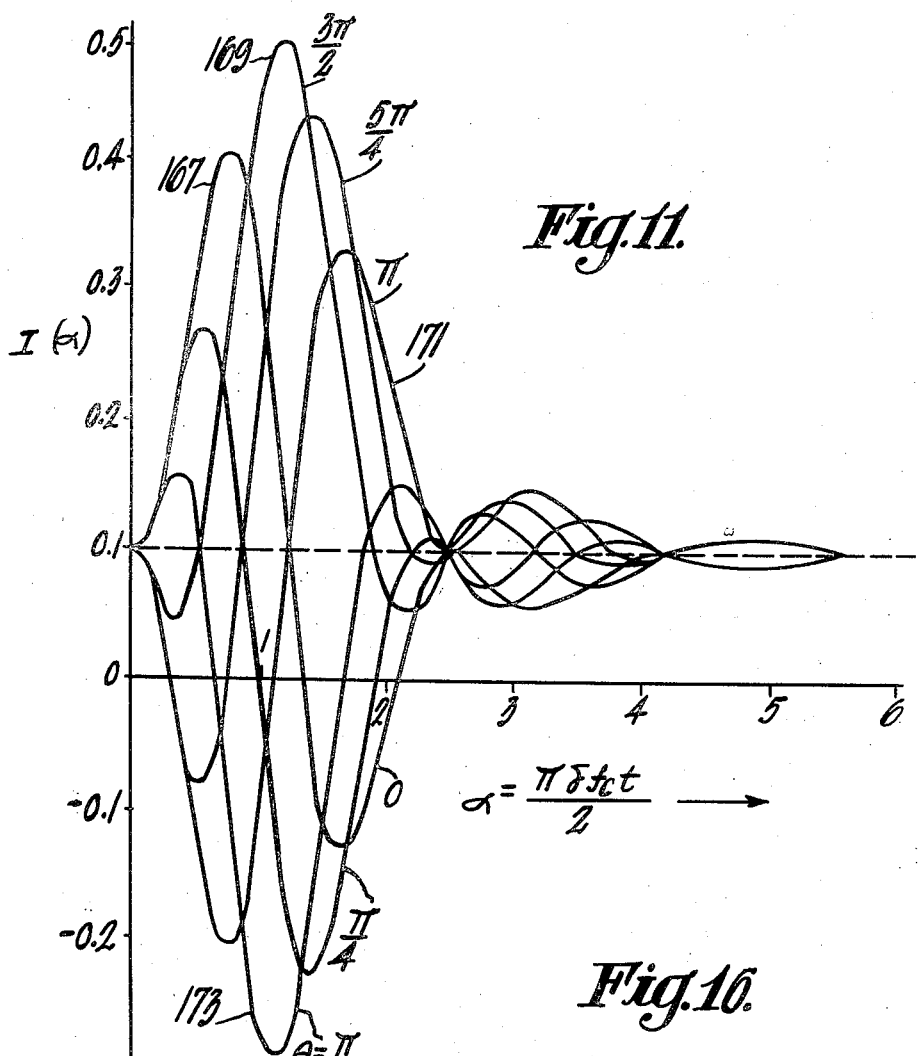
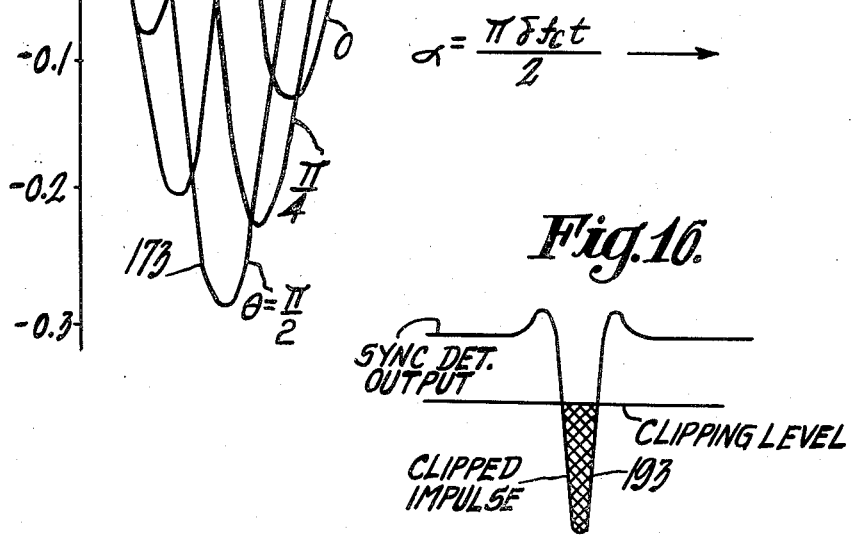

INVENTOR.
RICHARD W. SONNENFELDT

United States Patent Office 2,861,180
Patented Nov. 18, 1958

2,861,180

DETECTOR FOR VESTIGIAL SIDEBAND SIGNALS

Richard W. Sonnenfeldt, Delaware Township, Camden County, N. J., assignor to Radio Corporation of America, a corporation of Delaware Application May 2, 1955, Serial No. 505,184

The terminal fifteen years of the term of the patent to be granted has been disclaimed 3 Claims. (Cl. 250—20)

The present invention relates to signal detectors and more particularly to means for eliminating vestigial or single sideband demodulation distortion in television systems.

A linear detector will demodulate a vestigial sideband video-signal-modulated carrier with increased distortion than that distortion afforded a double sideband signal. If the vestigial sideband video-signal-modulated carrier is one describing a color image, then distortion due to the formation of beats between component signals, attendant noise and component signals particularly if produced to an increased amount by, say, a linear detector, will become an important consideration. In addition, envelope detection by a linear or square low detector of the vestigial sideband video-signal-modulated carrier in the presence of thermal or impulse noise will produce response, constituting distortion, which will impose severe limits on the minimum level of transmitted intelligence which can be recovered in the presence of this noise.

It is therefore an object of this invention to provide means for the elimination of vestigial sideband distortion or single sideband distortion in a transmission system.

It is a still further object of this invention to obtain from a vestigial sideband transmission system the same performance as may be obtained from an equivalent double sideband transmission system.

It is a still further object of this invention to provide a means for eliminating quadrature and intermodulation distortion in a vestigial sideband or single sideband transmission system.

It is yet another object of this invention to provide detection of a vestigial sideband television signal with improved signal-to-noise response.

It is a still further object of this invention to provide an improved means for recovery of the intelligence in a vestigial sideband signal modulated carrier in the presence of impulse and thermal noise.

According to the invention, the carrier and selected low frequency intelligence components forming a symmetrical band of components relative to the carrier are obtained from a vestigial sideband signal modulated carrier and combined with the vestigial sideband modulated carrier in a synchronous detector to provide demodulation by synchronous detection of the signal intelligence represented by the modulating signal.

Other and incidental objects of this invention will become apparent upon a reading of the specifications wherein the teachings of the invention are described in detail and upon a study of the following figures wherein:

Figure 1A shows the pass band of a bandpass filter having a center frequency of $f_c$.

Figure 1B shows a step alternating current voltage.

Figure 1C shows the response of the bandpass filter shown in Figure 1A to a step function modulated carrier whose frequency is outside of the pass band.

Figure 2 shows an envelope detector circuit.

Figure 3A shows the band characteristic of a vestigial sideband video signal modulated carrier.

Figure 3B shows a narrow band of low frequency intelligence components including the carrier which may be selected from the components shown in Figure 3A.

Figure 4A shows the vector diagram illustrating the vector resultant of a carrier and a low side frequency.

Figure 4B shows the vector resultant of a carrier, a lower side frequency, and an upper side frequency.

Figure 4C shows the vector diagram of the carrier.

Figure 4D shows the vector resultant of a carrier with a pair of low frequency side frequencies, of equal amplitude, representing modulation by one of the lower frequencies in the video signal.

Figure 5A shows a step function.

Figure 5B shows amplifier step function response which includes both in-phase and quadrature components.

Figure 5C shows amplifier step function response to a step function which constitutes in-phase component response.

Figure 6 is a block diagram of one form of the present invention.

Figure 7 is a schematic diagram of a balanced synchronous detector.

Figure 8 is a block diagram of a color television receiver utilizing the present invention.

Figure 9A is a schematic diagram of one form of second detector wherein both the wide band and the narrow band circuits are driven from the anode of an amplifier tube.

Figure 9B is a schematic diagram of one embodiment of a second detector which utilizes wide band feed from the cathode and narrow band feed from the plate of an amplifier tube.

Figure 10 shows the response of a flat stagger tuned triple stage amplifier to impulse noise as a result of the use of an envelope detector.

Figure 11 shows the response of a stagger tuned amplifier, utilizing a synchronous detector, to impulse noise.

Figure 12 shows the relationship between an applied modulating signal and the detected version of that modulating signal for the case where both an amplitude detector and a synchronous detector are used.

Figure 13 illustrates the vectors describing off-axis detection.

Figure 14:
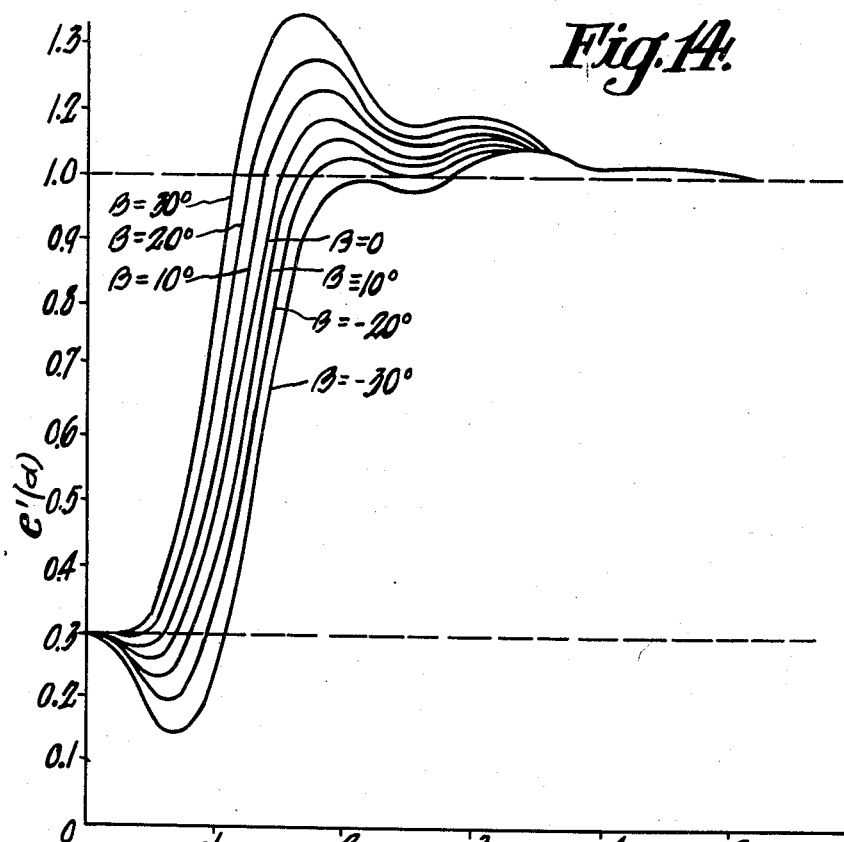

Figure 14 includes response curves illustrating the response during off-axis detection by a flat stagger tuned triple stage amplifier to a suddenly applied sine wave at the 50% response point with 70% modulation. The angle $\beta$ constitutes the degree of off-axis detection.

Figure 15:
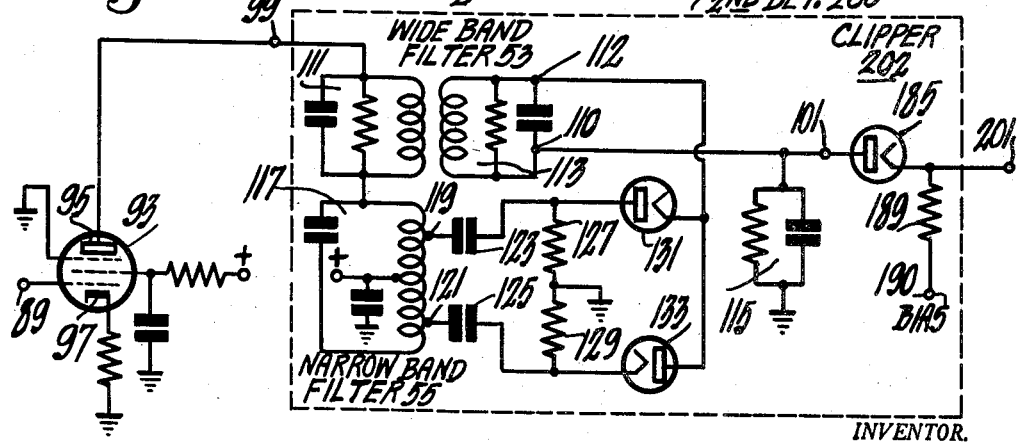

Figure 15 is a schematic diagram of a second detector which includes a noise clipping circuit.

Figure 16 shows the output of the circuit shown in Figure 15 to a typical impulse response function.

The present invention constitutes an improved means for detecting a wide band amplitude modulated intelligence modulated signal in the presence of both thermal and impulse noise. Consider first an aspect of impulse noise which will provide a concept useful in the understanding of the present invention.

Consider a filter which has the pass band 3 shown in Figure 1A. This pass band 3 includes a range of frequencies from $f_a$ to $f_b$ with a center frequency of $f_c$. Should a sine wave 5 of the type shown in Figure 1B be suddenly applied to this filter 3 and should the frequency $f_1$ of the sine wave 5 be outside of the pass band of the filter, then the response of the filter will be that waveform 7 shown in Figure 1C. This response is derived on page 368 of the book, Harmonics, Sidebands, and Transients in Communication Engineering by C. Louis Cuccia as published by the McGraw-Hill Book Company in 1952. It is important to note that the response of the filter will have for its oscillatory frequency, the center frequency $f_c$ of the pass band and not $f_1$, the frequency of the impressed wave.

The ringing response waveform 7 shown in Figure 1C may be described by the following equation:

$$e_0 = \frac{EK(f_b - f_a)}{2\pi(f_c - f_1)} \frac{\sin \sigma}{\sigma} je^{j\omega_c t} \quad (1)$$

where:

$$\sigma = \frac{f_b - f_a}{2}(t - t_d) \quad (2)$$

While types of noise, such as a shot effect and a thermal agitation noise, demand a certain minimum signal level for the readability of detected intelligence after transmission and must therefore be considered in all communication systems design, impulse noise is capable of completely disrupting communication because of the high intensity level at which these impulses frequently occur. In television transmission where synchronizing signals accompany the picture and the sound information, it follows that the center frequency ringing of the associated transmission networks, which accommodate the television signal, must be caused to occur at frequencies which do not inject spurious information into the synchronizing signal frequency regions.

Impulse noise is particularly destructive to the intelligibility of recovered signal information for yet another reason. Figure 2 shows a typical envelope detector circuit. Let a wide band signal be provided by the generator 11 to the resonant circuits 13 and 15 which are coupled and tuned to provide suitable pass band characteristics for this wide band signal. The rectifier 17, in conjunction with the resistance condenser circuit 19, will provide detection of the wide band signal information at the output terminals 21 and 23. The action of the rectifier 17 in conjunction with the resistance condenser circuit 19 provides for rectification of the wide band signal and for the developing of a bias voltage across the resistance condenser network 19 which follows the envelope of the wide band signal. Should impulse noise be included in the wide band signal provided by the generator 11, those frequencies in the impulse noise which are outside of the pass band provided by the resonant circuits 13 and 15 will then generate ringing responses of the type shown in Figure 1C. The oscillatory frequency of the ringing responses will be at the center frequency of the pass band of the resonant circuits 13 and 15 and will be at very high level thereby producing great peaks in the envelope of the wide band signal. The detection processes provided by the rectifier 17 and the resistance condenser network 19 will tend to follow the impulse noise peaks rather than the envelope due to signal intelligence; it follows then that the presence of the impulse noise will result in a reduction of the readability of the signal provided at the output terminals 21 and 23 due to this form of detector.

Certain concepts involving the nature of the carrier and side frequencies of a modulated wave, which are also useful for the achieving of an understanding of the present invention, are presented as follows:

Figure 3A illustrates the nature of the vestigial sideband video signal modulated carrier at intermediate frequencies. The IF video signal modulated signal band is described by the curve 27 with the carrier 25 located in a signal region where its amplitude is reduced by 50%. The side frequencies in the vicinity of the carrier 25 are attenuated according to the sloping amplitude characteristic 29.

In the vicinity of the carrier 25, both upper and lower side frequencies accompany the carrier through the side frequencies are of unequal amplitude. On the other hand, the higher frequency modulating signal represented at the frequency 35 does not have an accompanying side frequency on the other side of the carrier due to the use of the vestigial sideband transmission technique.

Figure 4A shows the condition where a carrier 25 is accompanied by a lower side frequency 31. A resultant 41 is produced which is out of phase with respect to the carrier by an extent dependent upon both the amplitude of the lower side frequency 31 and the instantaneous phase difference between the carrier 25 and the lower side frequency 31.

Figure 4B illustrates the case where both the lower side frequency 31 and the upper side frequency 33, having unequal amplitudes, flank the carrier 25. The upper side frequency 33 and the lower side frequency 31 add vectorially to provide the resultant 43. The resultant 43 and the carrier 25 add vectorally to provide the total resultant 45 whose amplitude and phase is a function of the amplitudes and the instantaneous phases of the contributing vectors.

Figure 4C shows the carrier 25 for the condition when the modulating signals are suppressed by a suitable filter circuit. The result then is the elimination of the modulation from the carrier 25.

Should the vestigial sideband video signal modulated carrier illustrated in Figure 3A be passed through a band pass filter which provides the narrow band signal shown in Figure 3B, the carrier 25 and the upper side frequency 33 and the lower side frequency 31 are retained. The vector summation of the carrier 25, the upper side frequency 33, and the lower side frequency 31 is shown in Figure 4D. By choosing a filter wherein these upper and lower side frequencies are adjusted to the same amplitude levels, it is seen that the resultant 47 has the same phase as the carrier 25. Consider the case when a carrier $\sin \omega_c t$ is modulated by two side frequencies included in the vector diagrams shown in Figures 4B and 4D.

Let the sidebands be of unequal amplitude and having the modulating frequency $\omega_m$. The resultant wave $e(t)$ is then described as:

$$e(t) = \sin \omega_c t + \frac{M_L}{2}\sin(\omega_c - \omega_m)t + \frac{M_u}{2}\sin(\omega_c + \omega_m)t \quad (3)$$

where $M_L$ and $M_u$ describe the amplitude of the lower and upper side frequencies, respectively. Equation 3 can be developed into the form:

$$e(t) = \sqrt{1 + \left[\frac{M_L}{2}\right]^2 + \left[\frac{M_u}{2}\right]^2 + \frac{M_L M_u}{4}\cos 2\omega_m t + [M_L + M_u]\cos \omega_m t} \sin[\omega_c t + \phi_1(t)] \quad (4)$$

where:

$$\phi_1(t) = \tan^{-1}\left[\frac{\frac{1}{2}[M_u - M_L]\sin \omega_m t}{1 + \frac{1}{2}[M_L + M_u]\cos \omega_m t}\right] \quad (5)$$

Equation 4 describes an amplitude and phase modulated wave having second and higher order amplitude distortion. When:

$$M_u = M_L \quad (6)$$

Equation 4 evolves into the form:

$$E_{NB} = kE_{WB} \quad (7)$$

$$= k\sqrt{1 + 2\left[\frac{m_L}{2}\right]^2 + \frac{m_L^2}{4}(2\cos^2 \omega_m t) - } \quad \substack{m_L = m \\ 1 + 2M_L \cos \omega_m t} \sin \omega_c t \quad (8)$$

$$= [1 + M_L \cos \omega_m t]\sin \omega_c t \quad (9)$$

where $k$ is a constant. $E_{NB}$ and $E_{WB}$ describe narrow band and wide band signals respectively.

Equation 9 shows that the resultant is in phase with the carrier.

When $\omega_m$ is sufficiently high so that in the case of a vestigial sideband video modulated carrier, $M_L=0$, then:

$$e_{WB}=\sqrt{1+\left[\frac{M_u}{2}\right]^2}+M_u \cos \omega_m t \sin [\omega_c t+\phi_2(t)] \quad (10)$$

where:

$$\phi_2(t)=\tan^{-1}\left[\frac{M_u \sin \omega_m t}{2+M_u \cos \omega_m t}\right] \quad (11)$$

Equation 10 describes a resultant which experiences both amplitude and phase modulation.

In general, the transient response of a four terminal network to a suddenly applied driving force may be described by the complex expression $$e(\alpha)=I(\alpha)+jQ(\alpha) \quad (12)$$

where $$\alpha=\frac{\pi \delta f_c t}{2} \quad (12a)$$

$f_c$ is the center frequency of the network, and $\delta$ is the percent bandwith. $I(\alpha)$ describes the in-phase component and $jQ(\alpha)$ describes the out-of-phase or quadrature component. These components provide a complete description of the amplitude and phase distortion present in the response.

When a modulated carrier having a finite bandwidth and including both upper and lower sidebands is transmitted through a network whose passband characteristics are sufficient to accommodate the finite bandwidth of the modulated carrier, the response of the transmission network will be only the in-phase response if the carrier frequency is adjusted to the center frequency of the transmission band. As the carrier frequency of the modulated carrier is adjusted toward one side of the transmission band or if the transmission band is shifted so that the carrier is no longer centered, the quadrature component appears in the response of the transmission channel. For discussion of quadrature components in transmission network response, see, for example, the paper by Nyquist and Pfleger entitled "The Effect of the Quadrature Component in Single Sideband Transmission" as published in the Bell System Technical Journal for January 1940 or the paper by Goldman entitled "Television Detail and Selective Sideband Transmission" as published in the Proceedings of the I. R. E. for November 1939.

Figure 5B illustrates the result of the presence of a quadrature component during the transmission of a step function as derived from the teachings of Goldman. A step function 48 is shown in Figure 5A. If this step function is used to modulate a carrier and if the carrier is transmitted through a network such that the carrier frequency is substantially in the center of the pass band of that network, then the response will be that response bearing the designator 50 in Figure 5C. This is a well known response characteristic which is characterized by a rise time and a ringing frequency which will be a function of the bandwidth of the transmission networks and also of the stored energy of that network. If the carrier frequency is adjusted to the edge of a passband, and if the step function 48 is utilized to modulate this carrier, then the response to this step function will be that response bearing the designator 49 shown in Figure 5B. The response 49 shown in Figure 5B now includes the quadrature component which distorts the shape of the response.

Synchronous detection according to the present invention, has the unique qualification in that only the in-phase component of response is detected. One great advantage of the use of the synchronous detectors is then that the transmission system acts not as a vestigial sideband transmission system but as a double sideband transmission system; in this way the economy realized as a result of the use of vestigial sideband transmission techniques is not at the expense of the readability or the fidelity of the reproduction of the recovered signal information.

One form of the present invention is illustrated by the block diagram shown in Figure 6. The intelligence modulated carrier is provided by the intermediate frequency vestigial sideband intelligence modulated carrier source 51. The frequency band caracteristics of the signal are those illustrated by the curve 27; the intermediate frequency vestigial sideband intelligence modulated carrier is supplied on an intermediate frequency carrier having the frequency $f_c$. The intermediate frequency vestigial sideband intelligence modulated carrier source 51 is coupled by way of terminal 99 to the wideband filter 53 and the narrow band filter 55. While the block diagram illustrating the second detector 100 in Figure 6 shows a series feed of the I. F. vetigial sideband intelligence modulated carrier to the wide band filter 53 and then to the narrow band filter 55, it is to be understood that either feed-connections are possible; for example, a shunt feed with the I. F. vestigial sideband intelligence modulated carrier simultaneously applied to the wide band filter 53 and the narrow band filter 55. The wide band filter 53 has the filter pass band 54 which is suitable for passing the entire intermediate frequency vestigial sideband intelligence modulated carrier. The narrow band filter 55 has the filter pass band 30 which selects the intermediate frequency carrier and a band of components in the vicinity of this carrier. The output of the wide band filter is hereinafter termed the wide band signal; the output of the narrow band filter is hereinafter termed the narrow band signal. The narrow band signal and the wide band signal are then applied to the synchronous detector 56 which detects the intelligence and presents this intelligence at the output terminal 101. The synchronous detector 56 may be in the form of a heterodyning device, a synchronous detector, a non-linear impedance or a signal mixer provided that its output is substantially independent of the amplitude of the narrow band signal. Should higher frequency components be produced due to the synchronous detector action, a suitable filter may be utilized for their elimination. The combination of circuits involving the wide band filter 53, the narrow band filter 55 and the synchronous detector are grouped within the dash-line box and given the title second detector and the designator 100.

The operation of the synchronous detector 56 shown in Figure 6 is illustrated by considering the circuit shown in Figure 7 which consists of a pair of diodes 58 and 59 which are coupled through the networks 62 and 60 to the transformer 61. The cathode of the diode 58 and the anode of the diode 59 are connected together and coupled to the time constant circuit 65 which represents the output circuit.

Let the narrow band signal:

$$e_2=E_{NB} \quad (13)$$

be applied by the generator 67 to the primary winding of the transformer 61. Let the wide band signal:

$$e_1=E_{WB} \quad (14)$$

be coupled to the midwinding connection 63 of the transformer 61 so that this wave is applied to the anode of the diode 58 in the same phase as to the cathode of the diode 59.

Let the following criteria be established:

$$R_1 C_1 \gg \frac{1}{\omega_c},\ R_1 C_1 \ll \frac{1}{\omega_m},\ R_2 C_2 > \frac{1}{\omega_c},\ R_2 C_2 < \frac{1}{\omega_m} \quad (15)$$

The voltage $E_{c_2}$ developed across the condenser 69 is the difference between the peak voltages $E_{c_1}$ and $E'_{c_1}$ developed by the diodes 58 and 59 across the condensers 71 and 73 respectively; that is $$E_{c_2}=E_{c_1}-E'_{c_1} \quad (16)$$

The voltage developed across the condenser 73 will become the peak value $e_1+e_2$. The voltage developed across the condenser 75 is the peak value of $e_1-e_2$. Let $$e_2 = E_2(t) \sin \omega t \qquad (17)$$
$$e_1 = E_1(t) \sin (\omega t + \varphi) \qquad (18)$$

then;

$$e_1+e_2 = \sin \omega t [E_2(t)+E_1(t) \cos \phi] + \cos \omega t [E_1(t) \sin \phi] \qquad (19)$$

$$= \sqrt{E_2^2(t)+E_1^2(t)+2E_1(t)E_2(t) \cos \phi} \, \sin (\omega t + \Delta) \qquad (20)$$

where:

$$\Delta = \tan^{-1}\left[\frac{\sin \phi}{E_2(t)+E_1(t) \cos \phi}\right] \qquad (21)$$

The peak voltage stored across the condenser 73 is $$E'_{c_1} = \sqrt{E_2^2(t)+E_1^2(t)+2E_1(t)E_2(t) \cos \phi} \qquad (22)$$

and the peak voltage stored across the condenser 75 is $$E_{c_1} = \sqrt{E_2^2(t)+E_1^2(t)-2E_1(t)E_2(t) \cos \phi} \qquad (23)$$

Let $$E_1 = kE_2 \qquad (24)$$

where $k \ll 1$; by using the binomial theorem it can be shown that $$E'_{c_1} - E_{c_1} = 2E_1(t) \cos \phi - \left[\frac{E_1}{E_2}\right]^2 \cos \phi + \ldots \qquad (25)$$

If $$E_1 \ll E_2 \qquad (26)$$

then $$\left[\frac{E_1}{E_2}\right]^2 \to 0 \qquad (27)$$

so that $$E'_{c_1} - E_{c_1} = E_{c_2} = 2E_1(t) \cos \varphi \qquad (28)$$

so long as $$E_2 \gg E_1 \qquad (29)$$

$E_{c_2}$ then depends upon $E_1$ only; the output of the circuit shown in Figure 7 is therefore proportional to the in-phase component of the envelope of $e_1$.

The output as developed across the time constant circuit 65 for low frequency video signal modulation may be described in the form:

$$E_{c_2} = 2\sqrt{1+\left[\frac{M_L}{2}\right]^2+\left[\frac{M_u}{2}\right]^2+\frac{M_u M_L}{4} \cos 2\omega_m t + [M_L+M_u] \cos \omega_m t \, [\cos \phi(t)]} \qquad (30)$$

Equation 30 can be developed into the form:

$$E_{c_2} = 2[1+\frac{1}{2}(M_u+M_L)] \cos \omega_m t \qquad (31)$$

This is undistorted output; the same output as would be obtained were the video signal transmitted double sideband and demodulated utilizing a peak detector.

The output as developed across the time constant circuit 65 for the case where $M_L = 0$, that is for higher frequency modulation, yields:

$$E_{c_2} = 2\left[1+\frac{M_u}{2}\right] \cos \omega_m t \qquad (32)$$

which is also free from amplitude and phase distortion.

In a super-heterodyne receiver of the type shown in Figure 8, the incoming signal is received at the antenna 81 and amplified in the R. F. amplifier 83. The output of the R. F. amplifier 83 is applied to the first detector 84 wherein the incoming signal is heterodyned to the intermediate frequency range. The intermediate frequency signal provided by the first detector 84 is amplified in the I. F. amplifier 85 and applied to the last I. F. stage 90 whose output is impressed on the second detector 100. The second detector 100 recovers the intelligence from the intermediate frequency signal and applies this intelligence to the signal utilization means 103.

In the case of a sound receiver the signal utilization means 103 constitutes an audio amplifier and a loud speaker. For a television signal receiver, the signal utilization means 103 will constitute an image reproducing apparatus including deflection and synchronizing signal utilization means for reconstruction of the transmitted image; if the transmitted image is a color television image the signal utilization means 103 must also include appropriate chrominance channels. In the case of radar reception, the signal utilization means 103 will then provide reproduction of the received radar signals on a suitable signal representation device.

When the I. F. signal delivered by the first detector 84 to the I. F. amplifier 85 is a vestigial sideband video signal modulated carrier, the degree of fidelity to which the television signal intelligence included in the vestigial sideband video modulated carrier may be recovered is a function of both the nature of the second detector 100, and the signal-to-noise ratio capability of the receiver.

A second detector of the present invention provides a considerable improvement over the prior art. The prior art includes one type of receiver known as the synchrodyne wherein the carrier frequency of an incoming signal is utilized to lock the frequency of a local oscillator. The output of this local oscillator is then heterodyned with the incoming signal to produce detection which has been found suitable for providing recovery of audio signals. For discussion of the principles and operations relating to the synchrodyne, see, for example, the paper by D. G. Tucker, entitled, "The Synchrodyne" as published in the Electrical Engineering for March 1948. The synchrodyne and similar methods rely strictly upon carrier frequency information for the demodulation processes.

In the present invention, not only is the amplitude, phase and frequency of the carrier information contained in the wide band signal utilized for the demodulation processes, but also many of the intelligence signals which flank the carrier in the wide band signal. It will be seen that the use of a relatively large group of signals constituting the narrow band signal and used for synchronous detection, enhance the ability of the detector of the present invention to distinguish the incoming signal intelligence in the wide band signal in the presence of noise. In the operation of detector circuits of the present invention, it has been determined that any attempt to clip the amplitudes of the narrow band signal or to remove the intelligence information directly represented in the narrow band signal in addition to the carrier information will cause a deterioration of the demodulation action to a point where the intelligence cannot be distinguished from attendant noise.

The schematic diagram of the second detector 100 shown in Figure 9A represents one form of detector of the present invention. The last I. F. stage 90 includes a transformer 87 shown in Figure 8 which applies the intermediate frequency vestigial sideband signal to the control grid 91 of tube 93 by way of terminal 89; the intermediate frequency vestigial sideband video signal modulated carrier has been designated at a previous point in this specification as the wide band signal. This wide band signal is amplified in tube 93 and applied by way of terminal 99 to the wide band filter 53 and the narrow band filter 55 of the detector 100.

The second detector 100 includes a pair of filter circuits. The wide band filter 53 includes the resonant circuit 111 and the resonant circuit 113 which are mutually coupled to form a network which is capable of developing the entire wide band signal across its output terminals 112 and 110. The resonant circuit 117 is connected in series with the resonant circuit 111 of the wide band filter 53. The resonant circuit 117 is a high-Q circuit whose pass characteristics are approximately those shown in Figure 3B; the resonant circuit 117 constitutes the narrow band filter 55 since it develops the symmetrical narrow band signal from the wide band signal. Signals developed in the resonant circuit 117 are delivered from the winding terminals 119 and 121 to the condensers 123 and 125 respectively. The condenser 123 is coupled to the anode of the diode 131 and the condenser 125 is coupled to the cathode of the diode 133. The resistance network made up of the series resistors 127 and 129 is coupled between the anode of the diode 131 and the cathode of the diode 133.

The cathode of the diode 131 and the anode of the diode 133 are connected together and both coupled to the terminal 112 of the resonant circuit 113. The terminal 110 of the resonant circuit 113 is coupled to the output terminal 101 from which the resistance condenser network 115 is connected to ground.

The action of the second detector 100 of Figure 9A follows closely that action described in connection with the circuit shown in Figure 7. The narrow band signal is applied to the anode of the diode 131 and the cathode of the diode 133. The wide band signal is coupled from the terminal 112 to both the cathode of the diode 131 and the anode of the diode 133. Synchronous detection of the signal intelligence in the wide band signal is accomplished with the demodulated intelligence appearing at the output terminal 101 and across the resistance condenser network 115. The synchronous detection action arises from the fact that the comparison of the wide band signal to the narrow band signal through the diodes 131 and 133 provides the nonuniform charging of the condensers 123 and 125 on the narrow band signal side of the diodes 131 and 133 and the corresponding nonuniform charging of the condenser of the resistance condenser network 115 on the wide band signal side of the diodes 131 and 133. This charging and discharging as provided through the diodes 131 and 133 develops a signal across the resistance condenser network 115 which is indicative of the wide band intelligence included in the wide band signal.

Figure 9B shows another embodiment of the present invention which differs slightly in manner of connection from the connection used by the circuits shown in Figures 8 and 9A; the second detector illustrated in Figure 9B is given the designation 102 to distinguish it from the second detector 100 and utilizes the parallel feed of the narrow and wide band filters previously mentioned in connection with Figure 6.

The anode 95 of the tube 93 is coupled to the narrow band filter 78 which herein consists of a resonant circuit 141 coupled to the resonant circuit 143. The resonant circuit 141 is a high-Q resonant circuit whose characteristics are suitable for selecting the carrier and a selected low modulating frequency side band region to provide separation of the narrow band signal from the wide band signal. The resonant circuit 143 has coil taps 145 and 147. The coil tap 145 is connected through the resistance condenser network 151 to the cathode of the diode 133. The coil tap 147 is connected through the resistance condenser network 149 to the anode of the diode 131.

The wide band filter 77 of the second detector 102 is driven by the coupling coil 153 which is driven by the cathode 97 of the tube 93 by way of terminal 150. The wide band filter 53 includes the band pass resonant circuit 113 which has impedance characteristics suitable for developing the entire wide band signal across its end terminals 112 and 110. Terminal 112 is coupled to both the anode of the diode 133 and the cathode of the diode 131. The terminal 110 is then coupled to the output terminal 101 with the resistance condenser network 115 coupled from this terminal 154 to ground in the same manner as is described in connection with the circuit shown in Figure 9A. The wide band signal is synchronously demodulated by the narrow band signal by use of the diodes 131 and 133 with the resulting video signal intelligence developed across the resistance condenser network 115 and therefore delivered to the output terminal 101.

Consider now some operational aspects of the overall second detector 100, hereinafter referred to, in these specifications, as a synchronous detector, of which the embodiments shown in Figures 9A and 9B represent operable versions.

Let the I. F. amplifier preceding the synchronous detector be a flat staggered triple stage amplifier which has the overall pass characteristics shown in Figure 3A. For the sake of comparison, assume that this flat staggered triple stage amplifier is operated into either a conventional detector of the type shown in Figure 2 or of the synchronous detector of the present invention. Let the flat staggered triple stage amplifier be excited by step-function-impulse-noise. In the presence of a carrier at the 50% point on the amplifier response curve, it can be shown mathematically that for the conventional detector, the response $e(\alpha)$ is described by the equation:

$$e(\alpha) = [A^2 + B^2 + 2AB \sin (2.401874\alpha + .341503 + \theta)]^{1/2} \tag{33}$$

where:

$$B = e^{-2\alpha} + \frac{2}{\sqrt{3}} e^{-\alpha} \sin\left(\sqrt{3}\alpha - \frac{\pi}{3}\right) \tag{34}$$

$$\alpha = \frac{\pi \delta f_c t}{2} \tag{35}$$

A represents the amplitude of the carrier and $\theta$ describes the phase of the carrier at the instant the impulse is applied. $\delta$ describes the percent bandwidth and $f_c$ is the center frequency in mcs. per second. $t$ describes time in microseconds.

For the case of a detector utilizing the principles taught by the present invention, the envelope of the impulse response in the presence of a carrier at the 50% point on the characteristic curve will be described by the equation:

$$I(\alpha) = A_c + \left[ e^{-2\alpha} + \frac{2}{\sqrt{3}} e^{-\alpha} \sin\left(\sqrt{3}\alpha - \frac{\pi}{3}\right) \right] \sin (2.401874 + .34150 + \theta) \tag{36}$$

Equations 33 and 36 are plotted in Figures 10 and 11 respectively in various values of $\theta$.

Figure 10 shows the responses 160, 161, 163 and 165 to a conventional peaked type of detector, due to impulses applied at various phases of the carrier; these and related responses will provide a substantial D. C. output of the detector regardless of the phases or the randomness of the phases involved.

The present invention has been shown to be responsive only to the in-phase component of the envelope of impulse response. As is shown in Figure 11, graphically, the output of the synchronous detector in response to impulses at random phase, thereby experiencing all possible phases during a prescribed interval of time, will constitute a wave wherein the impulse responses will cancel. Responses 169 and 173 will obviously cancel each other; responses 167 and 171 will also be cancelled by responses of reversed polarity which will arise from the randomness at which the impulses are applied. This is an important aspect of the use of the synchronous detector since the output of any detector at lower signal levels is very much dependent upon the impulse noise which is also developed at the output of that detector. Should the detector furnish a large average voltage arising from impulse response of the type shown in Figure 10, then the lower level of readability of the detected signal from such a detector will demand an intelligence signal of large amplitude. The output of a detector of the synchronous detector type will yield a zero average voltage due to impulse noise; therefore the minimum signal level required for readability of the intelligence will be much lower.

Figure 12 shows a comparison of $e_{out}$ which is the output voltage of a detector for an input voltage $e_{in}$ for both a peak detector and a synchronous detector. It is seen that the curve 179 for the peak detector flattens off due to the developing of noise voltage of the type shown in Figure 10. On the other hand, the curve 177 for the synchronous detector flattens off at a much lower value of $e_{out}$ then that which characterizes the curve 179.

Several of the other features of the use of the synchronous detectors which follow from the teachings of the present invention, may be listed as follows:

A. Whereby the noise components realized from the use of standard envelope detectors are a function of the carrier level, noise detection in the synchronous detector is relatively independent of carrier level.

B. In general, the efficiency of an envelope detector is decreased by the presence of noise; it is also well known in the art that the presence of noise effectively cuts down the effective modulation index. In a receiver which utilizes a synchronous detector, these effects are very much minimized due to the relative insensitivity of this type of detector to noise.

C. In an envelope type of detector, noise is beat against noise or against the signal thereby creating distortion components which can destroy the readability of the recovered signal information. In a synchronous detector these beats are not produced.

D. In a manner described in connection with Figures 9 and 10, the output of the synchronous detector produces virtually no D. C. component as a result of noise. This is an important improvement since the presence of the D. C. component effects the sync separation circuits and may be instrumental in incapacitating any automatic gain control circuit which may be involved.

E. An envelope detector detects the peak value of noise; the synchronous detector will detect only the root-mean square value of the noise, even in the presence of a weak carrier.

F. Consider the I. F. response curve shown in Figure 3A. It is evident there that for a video signal having modulating signal components out to 4.2 mcs. the center frequency of the I. F. transmission band may be adjusted to over 2 mcs. from the frequency of the carrier. It was shown in connection with Figure 1 that a ringing response of the type shown in Figure 1C having the ringing frequency which is the center of the transmission band, results from impulse noise produced at frequencies outside of the transmission band. Any ringing which therefore occurs in the intermediate frequency amplifier or channel as a result of impulse noise will then occur approximately 2 mcs. displaced from the carrier frequency. It is therefore possible to utilize a filter network which eliminates those frequencies above 2 mcs. in the recovered signal so as to realize a signal which is relatively independent of impulse noise. This filtered signal may then be utilized for automatic gain control or for synchronizing applications which will be relatively free of the effects of impulse noise. The envelope detector on the other hand will not be able to differentiate the fact that the ringing signals occur at frequencies in excess of 2 mcs; the output of the envelope detector will therefore be a signal which will clamp on to the peak value of these ringing signals in a manner whereby filtering action can not be used for removing them.

Another aspect of the use of improved synchronous detectors of the present invention, is one based on what may be termed "off axis tuning." In color television receivers, it is important that the tuning of the receiver not be so critical that the receiver will only function with fidelity at a single setting of the tuning knob. The use of the synchronous detector in numerous experiments has shown that receiver tuning does not require fine tuning to provide the recovered image. In fact, it was found that off tuning to an extent constituting several hundred kcs. could be performed before deterioration of the reproduced image became objectionable. An understanding of the ability of the synchronous detector in a superheterodyne to be relatively insensitive to fine tuning may be demonstrated by the following derivation.

Consider the use of a flat staggered tuned triple stage amplifier such as the I. F. amplifier 85 shown in Figure 6. For a flat staggered tuned triple stage amplifier, the equation for the response to a unit step of carrier applied at the 50% point in the intermediate frequency transmission characteristic curve is given by:

$$e(\alpha) = I(\alpha) + jQ(\alpha) \qquad (12)$$
$$= 1 + M(x \cos k\alpha + y \sin k\alpha) +$$
$$jM(x \sin k\alpha - y \cos k\alpha) \qquad (37)$$

where:

$$k = \frac{4}{\delta} \qquad (38)$$

$$\frac{\omega_0}{\delta} = \sqrt[6]{\frac{3}{2}} = c \qquad (39)$$

$$x = (1 - 4c^2)e^{-2\alpha} + \frac{1}{\sqrt{3}}(1 - 8c^2)e^{-\alpha}\sin\left(\sqrt{3}\alpha - \frac{\pi}{3}\right)$$
$$+ e^{-\alpha}\cos\left(\sqrt{3} - \frac{\pi}{3}\right) \qquad (40)$$

$$y = 2ce^{-2\alpha} + 2\sqrt{3}ce^{-\alpha}\sin\left(\sqrt{3}\alpha - \frac{\pi}{3}\right)$$
$$+ 2ce^{-\alpha}\cos\left(\sqrt{3}\alpha - \frac{\pi}{3}\right) \qquad (41)$$

$\alpha$ is described in connection with Equation 12a, $\omega_0$ is the angular frequency of the applied carrier and M represents the percent modulation. $e(\alpha)$ is a complex number whose real and imaginary components are diagrammed in Figure 13.

Consider now the case where the real and imaginary components of $e(\alpha)$ are shifted in phase thereby creating a condition analogous to off frequency tuning of a television receiver. If detection is accomplished at an angle of off axis detection, corresponding to the angle $\beta$ then off-axis response is that shown in Figure 13 and denoted as $e'(\alpha)$. $e'(\alpha)$ may be described in the following manner; since $$I(\alpha) = e(\alpha) \cos \psi \qquad (42)$$
$$\psi(\alpha) = e(\alpha) \sin \psi \qquad (43)$$

then:

$$e'(\alpha) = e(\alpha) \cos(\psi - \beta) \qquad (44)$$
$$= e(\alpha) \cos \psi \cos \beta + e(\alpha) \sin \psi \sin \beta \qquad (45)$$
$$= I(\alpha) \cos \beta + \psi(\alpha) \sin \beta \qquad (46)$$

$e'(\alpha)$ is diagrammed in Figure 14 as a function of $\alpha$ for various values of $\beta$ from $+30°$ to $-30°$. It is seen from Figure 14 that off axis detection does not unduly deteriorate the shape of the step function response in this range of values of $\beta$; in fact, for values of $\beta$ corresponding to negative angles, the ringing at the top of the response is greatly reduced. For some types of television signals, off axis detection may be employed to actually provide improvement in transient response.

Synchronous detectors of the present invention provide yet another aspect which constitutes an improvement over the conventional envelope type detectors. An envelope type of detector will follow the peak of any individual impulse noise responses of the type shown in Figure 10; in an envelope detector the polarity of these responses is always in the positive direction. Each of the synchronous detector impulse responses shown in Figure 11 is a function of the phase of the carrier at the instant the impulse is applied and has both a positive and negative portion. Curve 173, for example, is constituted principally by contributions of negative values. It follows then that by clipping the output of the synchronous detector at a position corresponding to the zero axis in Figure 11, those excursions of impulse responses which extend into negative regions may be clipped and removed from this signal. The clipping action then is particularly useful for the case where the impulse responses are not at random and do not necessarily cancel. The clipping action of a portion of each of the impulse responses provides the removal of a sizeable portion of the noise which would otherwise accompany the recovered intelligence.

A clipping second detector circuit 200, which includes clipping action, is shown in Figure 15. This circuit consists, as an example, of the second detector 100, shown in Figure 9A wherein the anode of the diode 185 of a clipper circuit 202 is connected to the output terminal 101. The cathode of the diode 185 is coupled to the new output terminal 201 with the resistor 189 connected from this cathode to a bias terminal 190. If then, the response at terminal 101 is such as to provide, for example, a wave of the type bearing the designation 173 shown in Figure 11, the output signal at the output terminal 201 will be that signal shown in Figure 16 wherein the portion of the impulse response occurring below the clipping level is then eliminated. The clipped portion of the impulse response is given the designation 193. The output signal presented at the output terminal 201 is then applied to a suitable signal utilization means.

The preceding discussion has described in detail many of the novel and important advantages which are characteristic of the present invention. It is also significant that these advantages, which so clearly demonstrate the superiority of the present invention over other types of detectors, can be accomplished with a minimum of circuitry. It is seen, for example, from a comparison of the circuit of the second detector 100 shown in Figure 9A and the circuit of the envelope detector shown in Figure 2 that only one resonant circuit, namely the resonant circuit 117, one diode, and the condensers 123 and 125, and the resistors 127 and 129 are required in addition to the circuit elements of the envelope detector of Figure 2.

Having described the invention, what is claimed is:

1. In a television receiver adapted to receive a vestigial sideband video signal modulated carrier, the combination of: a first circuit for deriving an intermediate frequency vestigial sideband video signal modulated carrier having carrier and video information components in a predetermined bandwidth; an intermediate frequency amplifier having an input circuit coupled to said signal deriving means and an output circuit, said intermediate frequency amplifier having a bandwidth suitable for the translation and amplification of said intermediate frequency vestigial sideband video signal modulated carrier to said output circuit, said output circuit having an output electrode at which is provided said intermediate frequency vestigial sideband video signal modulated carrier; a wide band circuit having a bandwidth substantially equal to said predetermined bandwidth of said intermediate frequency vestigial sideband video signal modulated carrier; a narrow band circuit having a bandwidth substantially equal to a bandwidth including said carrier and a prescribed range of lower modulating frequency video information components of said intermediate frequency vestigial sideband video signal modulated carrier; means to couple said wide band circuit and said narrow band circuit in series; means to operatively connect said serially connected wide band and narrow band circuits to said output electrode of said amplifier device; and synchronous detection means operatively connected to said wide band circuit and to said narrow band circuit whereby demodulation of said video information is caused by employing the carrier and the lower modulating frequency video information components provided by said narrow band circuit to synchronously demodulate said intermediate frequency vestigial sideband video signal modulated carrier provided by said wide band circuit.

2. In a wireless signal receiver adapted to receive a signal including a modulated carrier having a prescribed bandwidth in which occur both lower and higher modulating frequency components and also a carrier, the combination of: an amplifier device having a controllable electron stream and also having at least one control electrode capable of controlling the electron stream; means to apply said modulated carrier to said control electrode to introduce modulations representative of said modulated carrier into said electron stream; a wide band circuit having a bandwidth substantially equal to and in coincidence with said prescribed bandwidth of said modulated carrier; a narrow band circuit having a bandwidth corresponding to a frequency range of said modulated carrier which includes the carrier and a selected group of lower modulating frequency components; means to apply the modulations introduced into said electron stream by said modulated carrier from said electron stream to both said wide band and narrow band circuits; synchronous detector means operatively coupled to both said wide band and narrow band circuits and responsive to output signals from said wide band and narrow band circuits whereby demodulation of said higher and lower modulating frequency components in said modulated carrier is provided by employing said carrier and selected group of lower modulating frequency components to synchronously modulate said modulated carrier provided by said wide band circuit.

3. A signal detector comprising in combination: a circuit to provide a carrier modulated by intelligence represented by side frequencies flanking said carrier in a prescribed bandwidth; a narrow band filter circuit having a pass band corresponding to a frequency range corresponding to the frequency range which includes the carrier and a substantial group of side frequencies flanking the carrier in said prescribed bandwidth of said modulated carrier; means to apply said modulated carrier to said narrow band filter to derive therefrom a narrow band signal including said carrier and said group of side frequencies; means to develop a first and second polarity of said narrow band signal; first and second electron discharge devices each having electrodes capable of causing an increase or decrease in the intensity of the electron discharge; means to apply said intelligence signal to electrodes of said first and second electron discharge devices, means to apply said first and second polarities of said narrow band signal to electrodes of said first and second electron discharge devices respectively to cause simultaneous instantaneous increase or decrease in the intensity of the electron discharge to occur responsive to said narrow band signal and to cause signal interaction of said modulated carrier and said narrow band signal to take place in said first and second electron discharge devices; and means coupled to electrodes of said first and second electron discharge devices to derive said intelligence from said signal interaction.

References Cited in the file of this patent

UNITED STATES PATENTS

| 2,040,221 | Tubbs | May 12, 1936 |
| 2,165,764 | Pitsch | July 11, 1939 |
| 2,243,141 | Weagant | May 27, 1941 |
| 2,273,023 | Bellescize | Feb. 17, 1942 |

(Other references on following page)

UNITED STATES PATENTS

| | | | |
|---|---|---|---|
| 2,280,187 | Case | | Apr. 21, 1942 |
| 2,519,890 | Crosby | | Aug. 22, 1950 |
| 2,605,397 | Cheek | | July 29, 1952 |
| 2,623,169 | Gardere | | Dec. 23, 1952 |
| 2,713,606 | Sziklai | | July 19, 1955 |
| 2,718,546 | Schlesinger | | Sept. 20, 1955 |

FOREIGN PATENTS

| | | | |
|---|---|---|---|
| 433,863 | Great Britain | | Aug. 16, 1935 |

OTHER REFERENCES

Theory of Synchronous Demodulator as Applied in NTSC. Color Television Receiver, by Livingston, Proc. I. R. E., January 1954, p. 284–287.